(12) United States Patent
Jordil et al.

(10) Patent No.: US 6,760,977 B2
(45) Date of Patent: Jul. 13, 2004

(54) TRIGGER PROBE AND METHOD FOR ASSEMBLING A TRIGGER PROBE

(75) Inventors: Pascal Jordil, Ecoteaux (CH); Claude Rouge, Prangins (CH); Adriano Zanier, Prilly (CH); Charles-Henri Zufferey, Erde (CH)

(73) Assignee: Tesa SA, Renes (CH)

( * ) Notice: Subject to any disclaimer, the term of this patent is extended or adjusted under 35 U.S.C. 154(b) by 0 days.

(21) Appl. No.: 10/305,497

(22) Filed: Nov. 26, 2002

(65) Prior Publication Data

US 2003/0101609 A1 Jun. 5, 2003

(30) Foreign Application Priority Data

Nov. 30, 2001 (EP) .............................. 01811164

(51) Int. Cl.⁷ ............................................ G01B 7/02
(52) U.S. Cl. ......................................... 33/558; 33/561
(58) Field of Search ............................. 33/558; 1/561

(56) References Cited

U.S. PATENT DOCUMENTS

| | | | | | |
|---|---|---|---|---|---|
| 4,203,225 A | * | 5/1980 | Nilsson | ..................... | 33/561 |
| 4,270,275 A | * | 6/1981 | McMurtry | ................... | 33/561 |
| 4,815,214 A | * | 3/1989 | Enderle et al. | ............... | 33/832 |
| 4,859,817 A | * | 8/1989 | Cassani | ..................... | 33/561 |
| 4,934,065 A | * | 6/1990 | Hajdukiewicz et al. | ....... | 33/832 |
| 5,319,858 A | * | 6/1994 | Coy | ........................... | 33/561 |
| 5,884,410 A | * | 3/1999 | Prinz | ......................... | 33/559 |

FOREIGN PATENT DOCUMENTS

| | | |
|---|---|---|
| DE | 33252587 | 1/1985 |
| DE | 19738736 | 3/1998 |

* cited by examiner

Primary Examiner—Christopher W. Fulton
(74) Attorney, Agent, or Firm—Pearne & Gordon LLP

(57) ABSTRACT

Trigger probe, constructed on the principle of the Boys connection, serving to detect the contact between the probe's stylus and a piece to be measured, comprising an electric circuit with at least one switch, whose contact elements are positioned by means of several connecting elements of the circuit.

11 Claims, 3 Drawing Sheets

I - I

II - II

III - III

TRIGGER PROBE AND METHOD FOR ASSEMBLING A TRIGGER PROBE

FIELD OF THE INVENTION

The present invention concerns a trigger probe, ordinarily used on a measuring machine and serving to detect the contact between the probe's stylus and a piece to be measured. The present invention also concerns a method for assembling such a probe.

The content of Application No. EP01811164.1, filed on Nov. 30, 2001 with the European Patent Office, is hereby incorporated by reference.

RELATED ART

Trigger probes are electromechanical measuring elements used widely, but not only, on production lines of mechanical pieces, for example for regulating the production machines or for quality controls. They are used for an accurate checking of dimensions or for controlling the regularity of a surface or of a production batch.

Trigger probes are usually fastened on the mobile arm of a measuring machine whose position is determined precisely by means of measuring systems, for example capacitive, inductive, magneto-resistive or opto-electronic. The arm of the measuring machine is moved spatially along a determined trajectory until the probe's stylus comes into contact with the piece or surface to be measured. During contact, a deflective force is applied on the stylus, thus moving it out of its initial resting position. An electric circuit is then either closed or opened and a signal is usually sent on the one hand to the user, for example in the form of a light signal, and on the other hand to the software of the measuring machine that thus determines, on the basis of the data provided by the measuring system, the coordinates of the contact point in a given reference frame.

In another application, trigger probes are used for controlling the regularity of a surface or of a production batch. A probe is fastened on a stationary element and a surface or a series of pieces runs past the probe so as to brush against its stylus. If the surface presents irregularities or if the pieces are not of regular size, the probe's stylus will be subjected to a force which will move it out of its resting position, thus modifying the signal sent by the probe's electric circuit.

The main elements of a trigger probe are usually a fixed component, a stylus and an electric circuit.

The fixed component is stationary relative to the fastening element, the latter being usually incorporated to the probe's casing and enabling the probe to be fastened, for example on the mobile arm of a measuring machine.

The stylus is the mechanical element designed to come into contact with the surface or piece to be measured. The stylus is held by an elastic element in a resting position relative to the fixed component. This resting position is determined and reproducible. The stylus has one or several degrees of freedom relative to the fixed component. During contact with the surface to be measured, a deflective force is exerted on the stylus and will move it out of its resting position according to one or several of its degrees of freedom relative to the fixed component. When the force is no longer applied on the stylus, the latter returns in its resting position.

The electric circuit serves for detecting the movements of the stylus relative to its resting position. The electric circuit has at least one switch that is in a certain state, closed or open, when the stylus is in its resting position and in the opposite state when the stylus is deflected relative to this resting position. The impedance variations of the electric circuit are detected and processed by a signal processing circuit that then transmits the information to a user or, as the case may be, to a computing software that will process the information together with the data provided by a measuring system.

The precision and speed with which a contact between the stylus and a surface or piece to be measured is detected depends for a large part on the precision and speed with which the impedance variation of the electric circuit is detected and processed by the signal processing circuit. But it also depends on the quality of manufacture of the probe's elements, on the accuracy of their assembling and on their performance through time.

It will thus be easily understood that the positioning and the fastening of the switches' contact elements play an essential part in this precision.

The contact elements are generally constituted of conductive spherical elements that are placed in their support on the fixed component through a procedure that is long and delicate and consequently costly.

U.S. Pat. No. 4,270,275 proposes for example a trigger probe in which the switches' contact elements are constituted of balls of conductive material glued, for example with epoxy resin, in a lodging of the fixed component. The connecting elements completing the electric circuit are flexible conductors connecting the switches in series. The document does not explain in which manner the contact is ensured between the balls and the flexible conductors. In the case where the flexible conductors are welded or glued to the balls before assembly, they risk becoming disunited from the balls or to break during the assembly manipulations, and it is difficult to guarantee that the fastening point between the ball and the flexible conductor is oriented correctly at the end of the operation. Furthermore, it is difficult to weld a copper wire on a ball of hard metal and gluing is not reliable. If the wires are simply held in contact with the balls in the glue, the quality of contact cannot be guaranteed and the flexible wires can break through use or escape out of their lodging and thus lose their contact with the balls. Consequently, whatever the solution contemplated, the operation or series of operations is delicate and considerably increases the probe's price.

U.S. Pat. No. 6,275,053 tries to remedy these problems by proposing contact elements constituted of balls inserted in lodgings of determined depth in the fixed component and held in these lodgings by the casing of the trigger probe. The switches thus constituted are connected in series by the flexible connecting elements compressed between the ball and the casing. Such an embodiment however has several major disadvantages.

First, the balls' lodgings are of complex shape since they must be sufficiently closed to hold the ball in its position and sufficiently open so that the ball is contacted on one side by a conductive element closing the switch when the stylus is in resting position and on the other side by the flexible connecting element completing the circuit. The dimensions of the lodgings, in particular their depth, must also be sufficiently accurate so that, after assembly of the casing, the ball cannot move in its lodging and so that it exerts a pressure sufficient for establishing a good contact with the flexible connecting element. For these reasons, the manufacture of the fixed component of a probe as described according to different embodiments in U.S. Pat. No. 6,275,053 is costly and delicate.

The assembly of such a probe is also a delicate operation, since all the elements of the electric circuit must be accurately aligned in order for the latter to be correctly constituted and functional.

Furthermore, the contact between the ball and the flexible connecting element being effected by simple pressure, the ball and/or the connecting element will tend to become oxidized with time at their contact point, thus modifying the electric circuit's impedance until it eventually prevents the probe from functioning properly.

BRIEF SUMMARY OF THE INVENTION

The present invention proposes a trigger probe whose assembly is greatly facilitated by the fact that certain rigid connecting elements constituting the electric circuit are directly united with the switches' contact elements and contribute to the positioning of these contact elements. During assembly, the contact elements are held in an assembly tool by means of the connecting elements, thus allowing their positioning and their fastening in a single operation. The probe proposed by the present invention also avoids the oxidation problems at the contact points through the fact that the contact elements are welded to the connecting elements.

DESCRIPTION OF THE DRAWINGS

The invention will be better understood with the aid of the description of an embodiment of the invention given by way of example and illustrated by the attached figures, in which.

DETAILED DESCRIPTION OF THE INVENTION

The preferred embodiment of the invention is a trigger probe constructed on the principle of the Boys connection whose stylus 2, under the action of an exterior deflecting force, can be deflected from its initial position in the three dimensions of a given reference frame.

Figure 1:
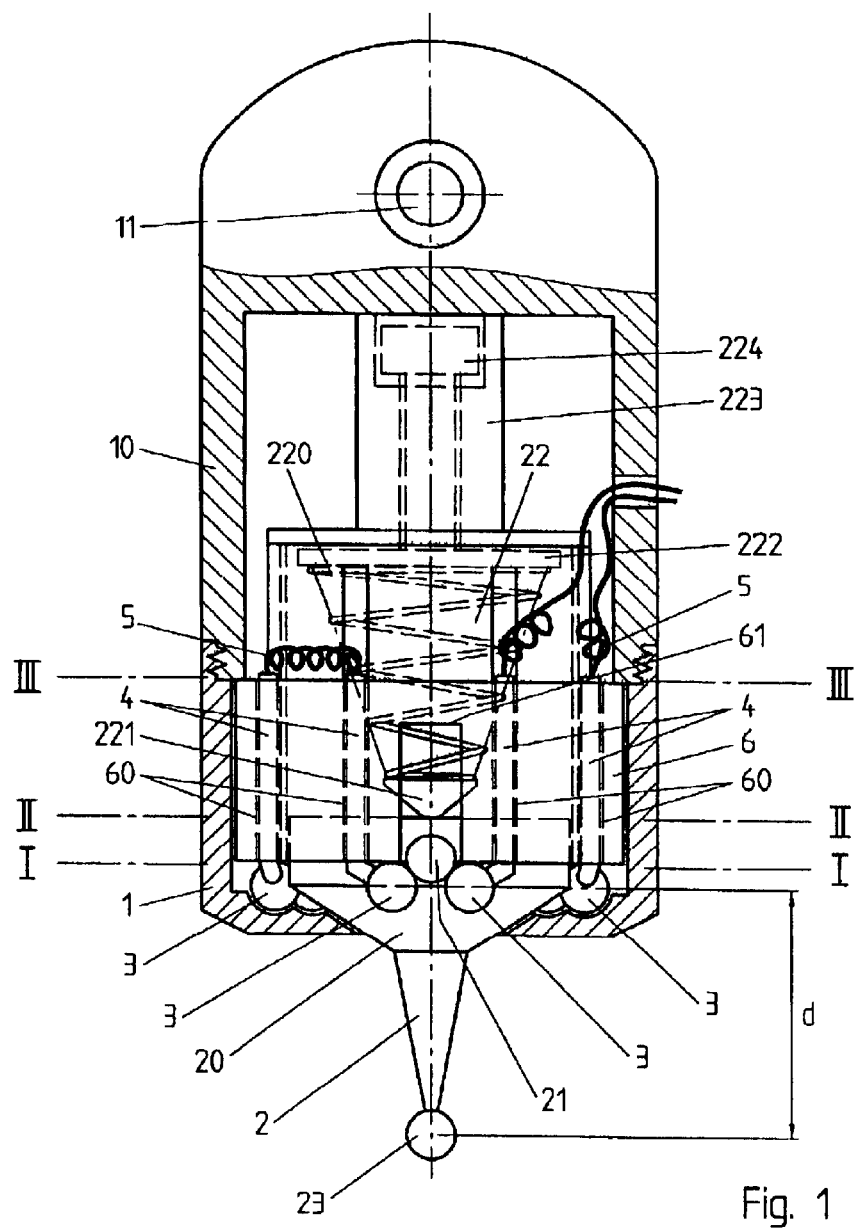
FIG. 1 shows a view of the main elements of a preferred embodiment of the invention.
Figure 2:
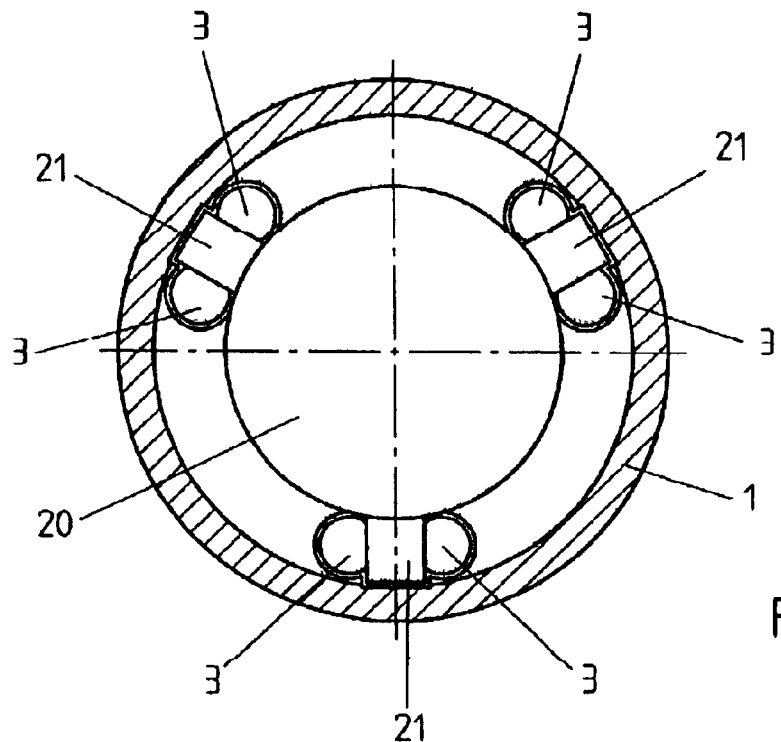
FIG. 2 shows a cross section of the view of FIG. 1 along an axis I—I.
Figure 3:
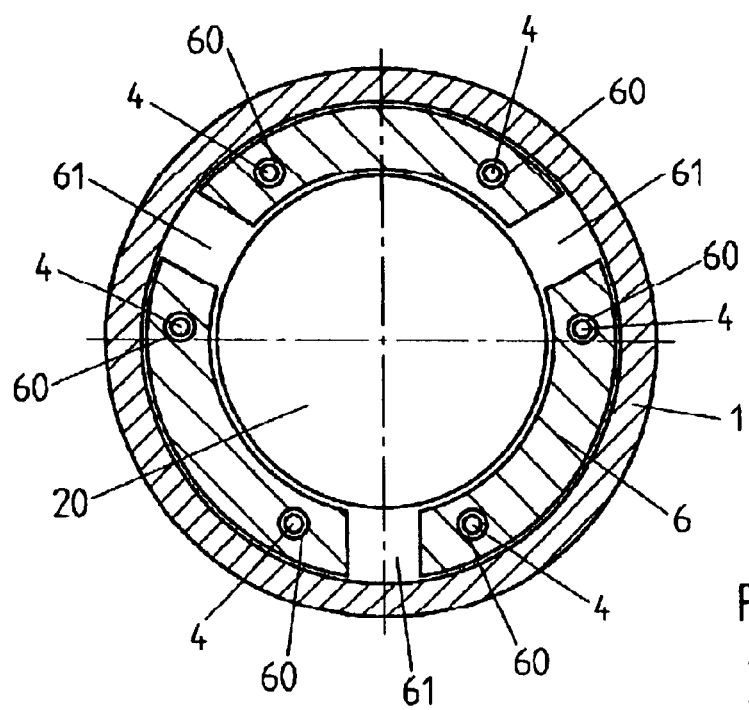
FIG. 3 shows a cross section of the view of FIG. 1 along an axis II—II.
Figure 4:
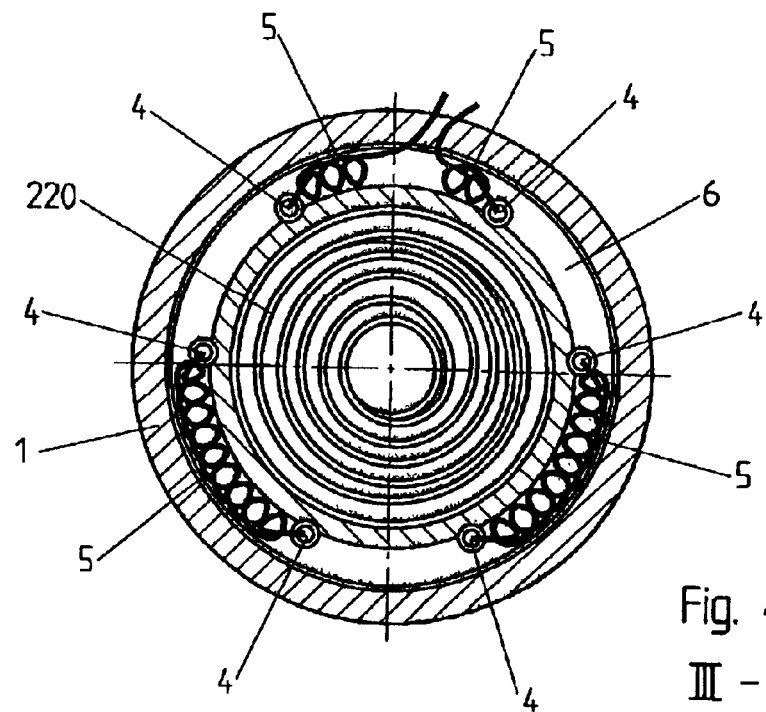
FIG. 4 shows a cross section of the view of FIG. 1 along an axis III—III.
Figure 5:
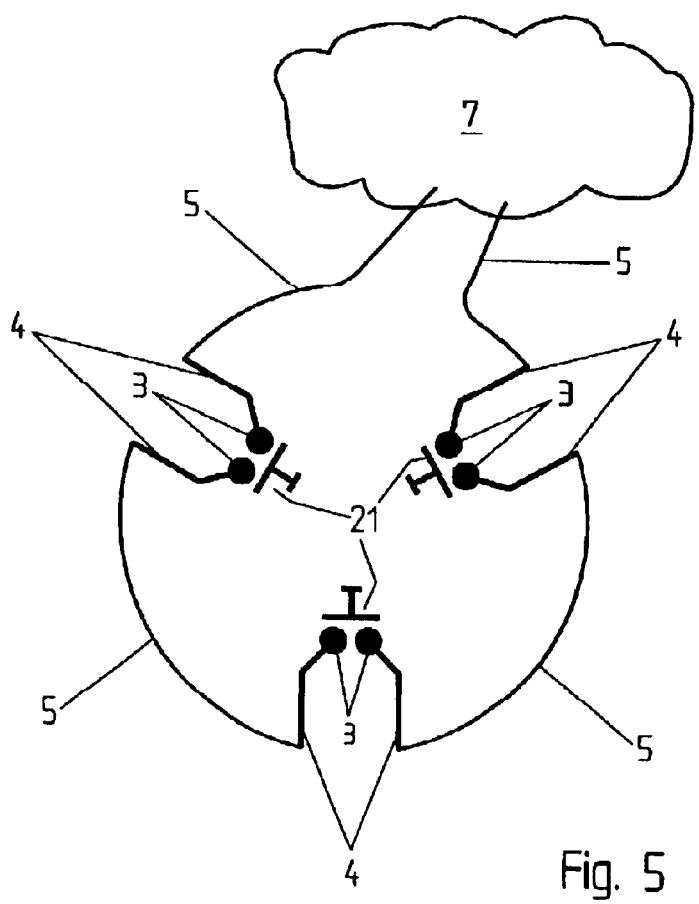
FIG. 5 shows a skeleton diagram of the probe's electric circuit.

Such a trigger probe has the following main elements:

a stylus 2 a stylus support 20 a fixed component 1 being part of the casing a holding mechanism 22 a guiding component 6 an electric circuit (FIG. 5)

The stylus 2 is constituted of a piece elongated along one axis and ending with a sphere whose position of the geometric center is perfectly repetitive.

The stylus support 20 is destined to support the stylus 2. The stylus 2 is screwed on the stylus support and can thus be easily replaced according to the applications or in case of damage. The stylus support 20 is also constructed geometrically around an axis and when the stylus 2 is screwed on the stylus support 20, the axes of the two parts are aligned. The stylus support 20 comprises three pins 21 of conductive material and insulated from one another. The pins 21 are fastened in holes that are perpendicular to the axis of the stylus support 20 and spread at regular intervals on its circumference. In a first variant embodiment, the pin support 20 is made of insulating material, thus causing the pins 21 to be insulated from one another. In a second variant embodiment, the stylus support 20 is made of conductive material, for example of aluminum, and each pin 21 is insulated by eloxation of the stylus support 20 or by adjunction of an insulating material before or during their fastening.

The fixed component 1 is fixed relative to the fastening element 11 enabling the probe to be fastened, for example, to the mobile arm of a measuring machine. Thus, the position of the fixed component 1 relative to the fastening element and, by extension, to the arm of the measuring machine, for example, is fixed. The fixed component 1 comprises six lodgings for receiving each a contact element 3. In order to rapidly detect any movement of the stylus, these lodgings are situated as close as possible to the ball 23 of the stylus 2, thus reducing the distance d. For reasons of manufacturing accuracy, the fixed component 1 is made preferably of aluminum and is then eloxated so as to ensure a good electric insulation between the contact elements.

The holding mechanism 22 is constituted of a spring 220 slightly under tension pressing on one side on a lid 222, ending at the other extremity by a conical piece 221 pressing on the center of the stylus support 20, enabling the latter to be centered and held in its resting position. The tension of the spring 220 can be regulated by means of the screw 224 that allows the position of the lid 222 to be modified relative to the lid 63.

The guiding component 6 is made of insulating material. It is essentially cylindrical and allows to lodge the stylus support 20 and the holding mechanism 22 serving to hold the stylus 2 in its resting position. Three cuttings 61 are spread in the circumference of the guiding component 6 in order to lodge the pins 21 of the stylus support 20 and to guide their movement when a deflecting force is applied on the stylus 2. On each side of each cutting 61 is an opening 60 provided for lodging a connecting element 4.

The electric circuit of a trigger probe constructed on the principle of the Boys connection comprises six contact points mounted electrically in series. These six contact points can be seen as three switches as represented in FIG. 5, each comprising two contact elements 3 and a contactor, realized in the preferred embodiment of the invention by one of the pins 21 of the stylus support 20. The switches are interconnected by rigid connecting elements 4 and flexible conductors 5 along the diagram of FIG. 5. The switches' contact elements 3 are metallic balls. Each contact element 3 is welded to a connecting element 4 formed of a rigid metallic rod and possibly slightly bent near the contact element 3. The welding of the connecting elements 4 onto the contact elements 3 is done preferably by brazing, i.e. by means of a flame-molten filler metal whose melting point is lower than that of the elements to be assembled. The contact element 3 and the connecting element 4 can also be two parts of a piece worked in a single operation.

During assembly of the probe, a drop of glue, for example of epoxy resin, is deposited in each lodging of the contact element 3. The connecting elements welded to the contact elements are held on an assembly tool (not represented) of a construction similar to that of the guiding component 6. The assembly tool comprises cylindrical lodgings placed identically to the openings 60 of the guiding component 6. The connecting elements 4 are inserted and held in these lodgings, thus determining the position of the contact elements. The assembly tool is then slid inside the fixed component to bring each contact element in its lodging and to hold it there until the glue has completely hardened. The assembly tool, thanks to the rigid connecting elements 4, thus makes it possible for the six contact elements simultaneously to be guided and held during gluing. The balls' position is thus defined precisely by the lodgings; temporary pins, similar to the definitive pins 21, can be used during gluing.

Once the glue has hardened, the assembly tool is withdrawn. The stylus support 20 is inserted in the guiding component 6, the position of the stylus support 20 being determined by the placing of the pins 21 in the cuttings 61. The guiding component is then put in the place of the assembly piece, the connecting elements 4 being thus inserted in the openings 60. The electric circuit is completed by welding of the flexible conductors 5 on the extremities of the connecting elements 4 opposite the contact elements 3 following the diagram of FIG. 5. The holding mechanism 22 is then mounted by applying a spring against the stylus support 20 and closing the lid of the guiding component 6. The tension of the spring 220 is regulated by the screw 224. Finally, assembly is completed by screwing the top of the casing 10.

When the stylus 2 is in resting position, each of the three pins 21 is in contact with the two contact elements 3 partially obturating the cutting 61 in which it can move, thus closing each switch. The electric circuit is closed.

When a deflecting force is applied on the stylus 2, the latter leaves its resting position, causing at least one of the three pins 21 of the stylus support 20 to move in the cutting 61 serving as its guide and to become separated from the corresponding contact elements 3, thus opening at least one switch. The electric circuit is then open, which is detected and processed by the signal processing circuit.

When the deflecting force is no longer exerted on the stylus 2, the latter reverts to its resting position under the action of the holding mechanism 22, thus closing all the switches. The electric circuit is again closed.

In a second variant embodiment, the flexible conductors 5 are replaced by flexible conductors (not represented) applied through pressure against the extremity of the connecting elements and held in position by the top of the casing 10.

In a third variant embodiment, the connection between two adjacent switches is ensured by a single rigid connecting element having at each of its extremities a contact element of one of the switches it links. This variant embodiment avoids the welding of flexible conductors 5 and thus reduces the number of operations necessary for assembly.

During assembly of a probe according to the invention, the positioning and fastening of the contact elements 3 are greatly facilitated by the rigidity of the connecting elements 4, which allows an adapted assembly tool to easily place them in their lodgings on the fixed component 1, even if these lodgings are difficult to access due to their position at the bottom of the fixed component 1.

All the elements of the electric circuit, apart from the pins 21 that close and open the switches, are welded to one another. Consequently, the risk of oxidation at the contact points causing an alteration in the quality of the electric circuit is eliminated, which destines such a probe to a long lifetime.

The aforementioned variant embodiments describe all a three-dimensional trigger probe. The one skilled in the art will however understand that the principle of the invention can apply also to bi-directional or one-dimensional trigger probes.

In another variant embodiment of the invention, the trigger probe has an electric circuit whose switches are mounted electrically in parallel and are all open when the stylus is in resting position. When the stylus comes out of its resting position through the action of a deflecting force, at least one of the switches is closed, thus changing the impedance of the electric circuit.

What is claimed is:

1. A probe, comprising:
   a fixed component,
   a stylus held by a flexible element in a resting position relative to said fixed component, said resting position being reproducible, said stylus being capable of moving from said resting position in response to a deflecting force and moving back to said resting position when said force is no longer applied,
   an electric circuit integrating at least one switch and connecting element to said at least one switch, said at least one switch being closed or open when said stylus is in said resting position and in the opposite state when said stylus is deflected relative to said resting position, said at least one switch comprising contact elements, at least one of said contact elements being united with at least one of said connecting elements,
   said at least one connecting element being a rigid metallic element attached to said fixed component.

2. The probe of claim 1, at least one said switch comprising two contact elements each connected to a rigid connecting element to electrically connect them to contact elements of another switch.

3. The probe of claim 1, said at least one connecting element being welded or brazed to said at least one contact element.

4. The probe of claim 2, said at least one connecting element and said at least one contact element constituting two parts of a same piece.

5. The probe of claim 2, said at least one connecting element being constituted of a rigid metallic rod.

6. The probe of claim 5, said electric circuit being completed by flexible electric conductors welded onto said connecting elements.

7. The probe of claim 5, said electric circuit being completed by springs of conductive material applied through pressure against said connecting elements.

8. The probe of claim 1, at least one of said connecting elements (4) comprising a united contact element at each of its extremities.

9. A method for assembling a probe, said probe comprising:
   a fixed component,
   a stylus held by a flexible element in a resting position relative to said fixed component, said resting position being reproducible, said stylus being capable of moving from said resting position in response to a deflecting force and moving back to said resting position when said force is no longer applied,
   an electric circuit integrating at least one switch and connecting element to said at least one switch, said at least one switch being closed or open when said stylus is in said resting position and in the opposite state when said stylus is deflected relative to said resting position, said at least one switch comprising contact elements, at least one of said contact elements being united with at least one of said connecting elements,
   said at least one connecting element being a rigid metallic element, the method comprising a step of mounting said at least one contact element on said fixed component by means of said at least one connecting element of said electric circuit.

10. The method of claim 9, said mounting of the at least one contact element being performed by means of an assembly tool holding the at least one connecting element in a position enabling the at least one contact element to be inserted in its lodging.

11. A probe, comprising:

a fixed component, a stylus held by a flexible element in a resting position relative to said fixed component, said resting position being reproducible, said stylus being capable of moving from said resting position in response to a deflecting force and moving back to said resting position when said force is no longer applied, an electric circuit integrating at least one switch and connecting element to said at least one switch, said at least one switch being closed or open when said stylus is in said resting position and in the opposite state when said stylus is deflected relative to said resting position, said at least one switch comprising contact elements, at least one of said contact elements being united with at least one of said connecting elements, at least one said switch comprising two contact elements each connected to a rigid connecting element to electrically connect them to contact elements of another switch, said at least one connecting element being constituted of a rigid metallic rod.

* * * * *